United States Patent [19]

Nishikawa

[11] Patent Number: 5,880,818
[45] Date of Patent: Mar. 9, 1999

[54] PHOTOGRAPHIC PRINTING AND DEVELOPING APPARATUS

[75] Inventor: Hidetoshi Nishikawa, Wakayama, Japan

[73] Assignee: Noritsu Koki Co., Ltd., Wakayama, Japan

[21] Appl. No.: 593,056

[22] Filed: Jan. 29, 1996

[30] Foreign Application Priority Data

Jan. 30, 1995 [JP] Japan ..................................... 7-012652
Oct. 11, 1995 [JP] Japan ..................................... 7-263244

[51] Int. Cl.⁶ ................................................... G03B 27/32
[52] U.S. Cl. ................................................. 355/72; 355/27
[58] Field of Search .................................. 355/72, 74, 77, 355/27; 271/3.19, 9.07

[56] References Cited

U.S. PATENT DOCUMENTS 4,416,529   11/1983   Kastl .
4,920,383    4/1990   Cook ........................................ 355/311
4,943,832    7/1990   Emori ....................................... 355/313
5,335,045    8/1994   Kunz et al. ................................. 355/72

FOREIGN PATENT DOCUMENTS 0 629 915   12/1994   European Pat. Off. .
2 678 747    1/1993   France .

Primary Examiner—Safet Metjahic
Assistant Examiner—John Chizmar
Attorney, Agent, or Firm—Wenderoth, Lind & Ponack, L.L.P.

[57] ABSTRACT

A photographic printing and developing apparatus includes a turnout device for separating a transfer path, along which sheets of printed paper are conveyed from a printing station to a development station, into a main transfer path and a branch transfer path. A joining device joins the branch transfer path to the main transfer path at a position downstream of the separating position. The turnout device selectively transfers sheets of printed paper of a given size to the branch transfer path.

22 Claims, 18 Drawing Sheets

PHOTOGRAPHIC PRINTING AND DEVELOPING APPARATUS

BACKGROUND OF THE INVENTION

The present invention relates to a photographic printing and developing apparatus.

A known photographic printing and developing apparatus comprises a magazine 21A for accommodating a roll of photosensitive paper P1, a printing module 21B, a development module 21C, and a transfer path 21D for conveying the paper P1 from the printing module 21B to the developing module 21C, as shown in FIGS. 24 and 25. During operation, the paper P1 is unloaded from the magazine 21A, cut into sheets of a desired size, subjected to a printing process in the printing module 21B, and conveyed along the transfer path 21D to the development module 21C for development.

The transfer path 21D of the known photographic printing and developing apparatus may be a single line extending from the magazine 21A (FIG. 24) or a combination of two lines from a pair of magazines 21A and 21A' (FIG. 25). In the latter, the two magazines 21A and 21A' feed papers P along respective transfer paths 21E and 21E' which are later joined to each other forming the transfer path 21D.

Also, the known photographic printing and developing apparatus recently has been modified to include a paper handling device such as a paper pausing device for feeding the sheets of paper P to the development module 21C at a constant rate regardless of the speed of operation at the printing module 21B or a paper direction shifting device for shifting the direction of the sheets of paper P to increase the efficiency of feeding. The paper handling device is disposed substantially across the transfer path 21D.

While such paper handling device is capable of handling typical service sizes of paper sheets including E, L, KG (4×6 inches), and panorama formats, extra sizes used for enlargement cannot be subjected to operations of pausing or direction shifting.

If the transfer path 21D is a single line, it is necessary to allow any size of the paper P to be conveyed therethrough. This requires optimum dimensions of the paper handling device, thus increasing the overall cost of production. In addition, it takes a considerable length of time for enlarged sizes of the paper to pass through the paper handling device and will create a time loss during operation.

A modification of the known photographic printing and developing apparatus provided that the width of the transfer path 21D is increased at a midway portion thereof, and a succession of the paper sheets is divided by a turnout device 21F into two (FIG. 26) or more rows for increasing the number of sheets fed. In this case, the transfer path 21D is still a single line and has to allow any size of the paper sheets to pass therethrough.

SUMMARY OF THE INVENTION

It is an object of the present invention, in view of the above predicaments, to provide an improved photographic printing and developing apparatus capable of conveying sheets of printed paper of a given service size along a specific transfer path while conveying directly to a development station sheets of an enlarged size which need not be passed through paper devices.

A photographic printing and developing apparatus according to the present invention provides for separating a transfer path, along which sheets of printed paper are conveyed from a printing station to a development station, into a main transfer path and a branch transfer path, joining the branch transfer path to the main transfer path at a position downstream side of the separating position, and providing at the separating position a turnout device for selectively transferring the sheets of printed paper of a given size to the branch transfer path.

Paper handling devices including a paper pausing device and a paper direction shifting device are provided across the branch transfer path.

The turnout device may include paper guides and a roller assembly having movable rollers for switching the direction of transfer to the branch transfer path. The turnout device may include a flexible paper guide capable of being turned to the branch transfer path. The turnout device may include comprises a movable paper guide capable of being located at the separating position so that the direction of transfer is switched to the branch transfer path.

The turnout device may include a branch conveyor belt assembly for transferring the sheets of printed paper of a narrower size selectively to the branch transfer path by nipping them between two belts, and one or more main conveyor belt assemblies provided in parallel to the branch conveyor belt assembly for transferring the sheets of printed paper of a wider size selectively to the main transfer path by nipping them between two belts. A support guide may be provided for assisting the sheets of the narrower size to travel through the branch conveyor belt assembly and the sheets of the wider size to travel across the main conveyor belt assemblies. Movement of the support guide may be controlled by a controller.

Movement of the turnout device may be controlled by a controller means including a detector for detecting the size of each sheet of printed paper, and a determinator responsive to a detection signal from the detector for producing a control signal to control the movement of the turnout device.

In operation of the photographic printing and developing apparatus of the present invention, sheets of printed paper of a given service size are selectively transferred from the transfer path to the branch transfer path at the separating position by the turnout device. The sheets of printed paper of the given size are then subjected to temporary pausing or storage and direction shifting by respective paper handling devices mounted across the branch transfer path, and then are passed back to the main transfer path before being conveyed to the development station. Meanwhile, sheets of printed paper of enlarged size are directly conveyed through the main transfer path to the development station without traveling along the branch transfer path.

DETAILED DESCRIPTION OF THE PREFERRED EMBODIMENTS

Figure 1:
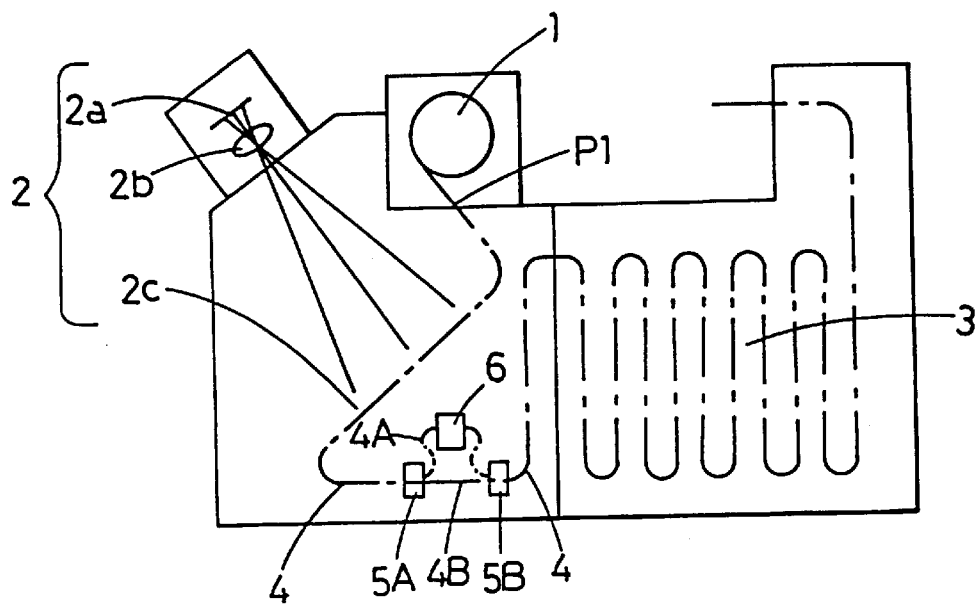
FIG. 1 is a schematic view of a photographic printing and developing apparatus according to an embodiment of the present invention.
Figure 2:
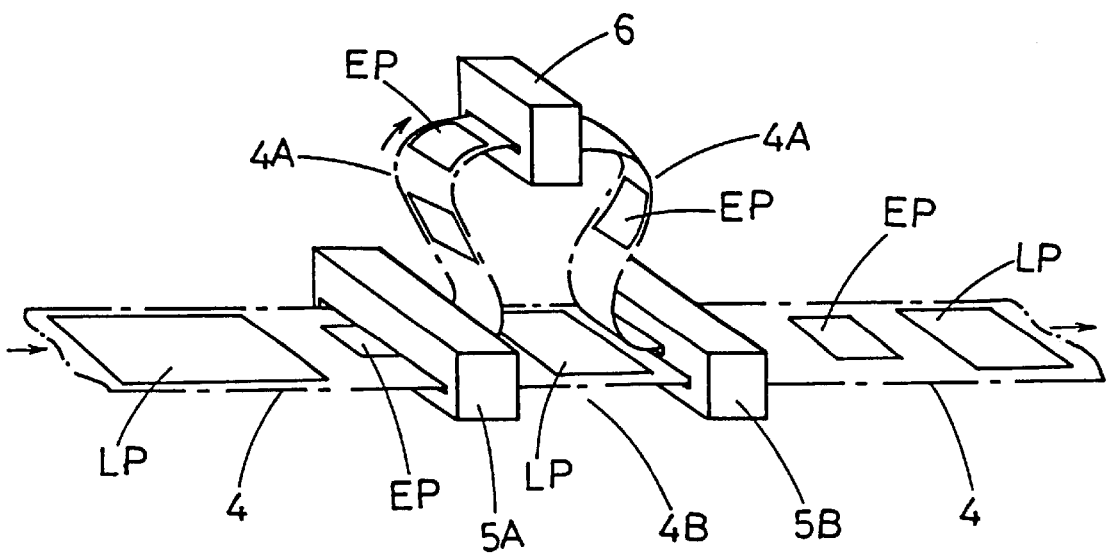
FIGS. 2 to 4 are enlarged perspective views of portions thereof.

FIG. 1 is a schematic view of a photographic printing and developing apparatus according to the present invention which comprises a magazine 1 for accommodating a roll of (photosensitive printing) paper P1, a printing module 2, a development module 3, and a transfer path 4 for conveying sheets of the paper P1 from the printing module 2 to the development module 3. The printing module 2 is provided for printing images of a negative film on applicable format sheets EP and LP of the paper P1 and includes a light source unit (not shown), a negative mask 2a, a lens unit 2b, and an exposure station 2c. The development module 3 subjects the printed paper to a development process and comprises a development tub, a bleaching tub, a stabilizer tub, and a dryer.

The transfer path 4 is separated at a mid portion thereof into a branch transfer path 4A and a main transfer path 4B. The two paths 4A and 4B are joined again at a position downstream of a position of separation. A turnout assembly 5A is disposed at the position of separation while a joining device 5B is provided at the position of joining. The branch transfer path 4A extends above the main transfer path 4B which extends a minimum distance between the separating position and the joining position.

Figure 3:
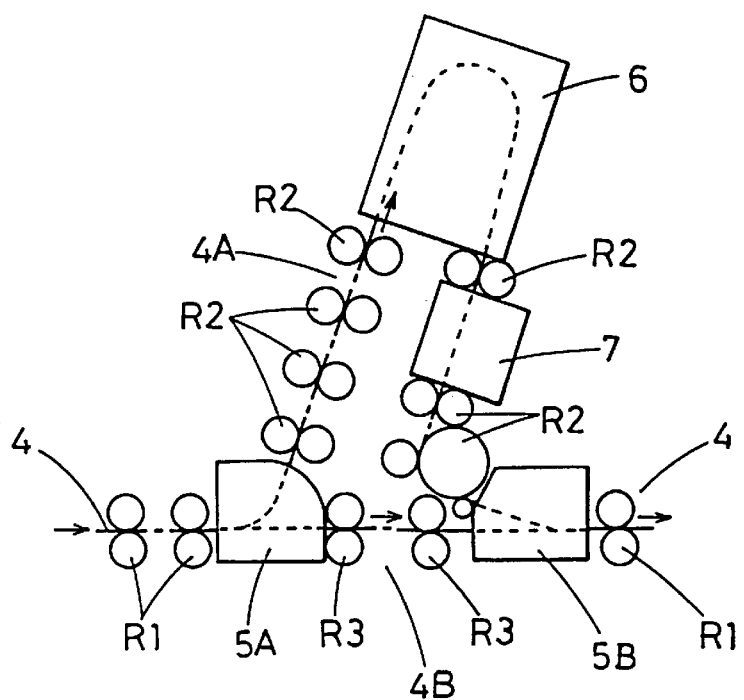
Figure 4:
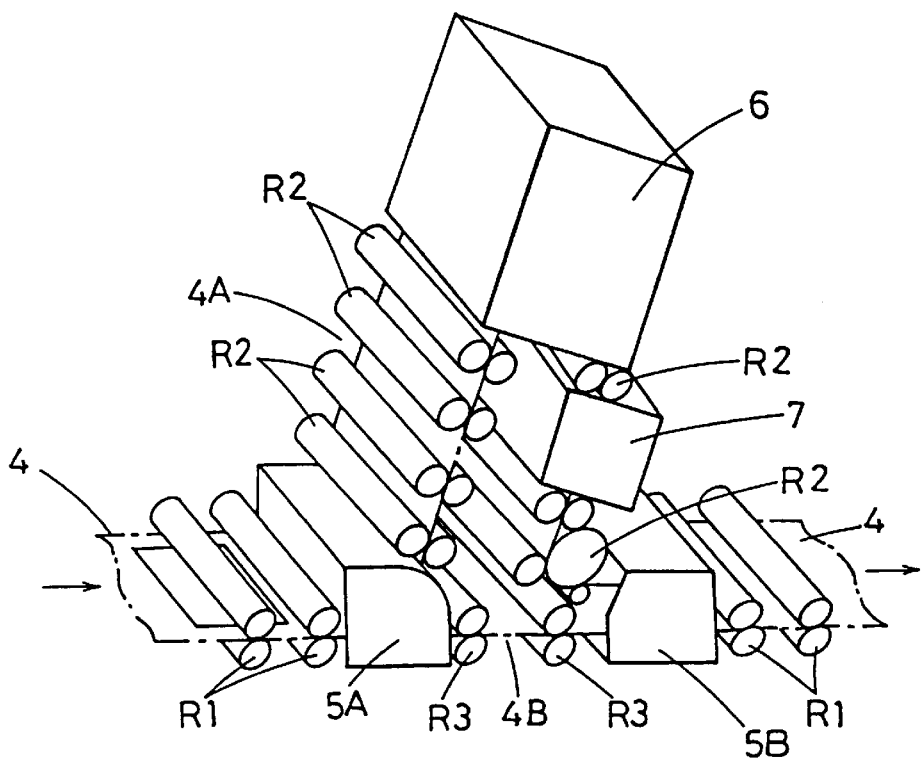

A paper pausing device 6 (described later in more details) and a direction shifting device 7 (described later) are disposed across the branch transfer path 4A as best shown in FIGS. 3 and 4. Transfer rollers R1, R2, and R3 are mounted along the transfer path 4, branch transfer path 4A, and main transfer path 4B.

Figure 5:
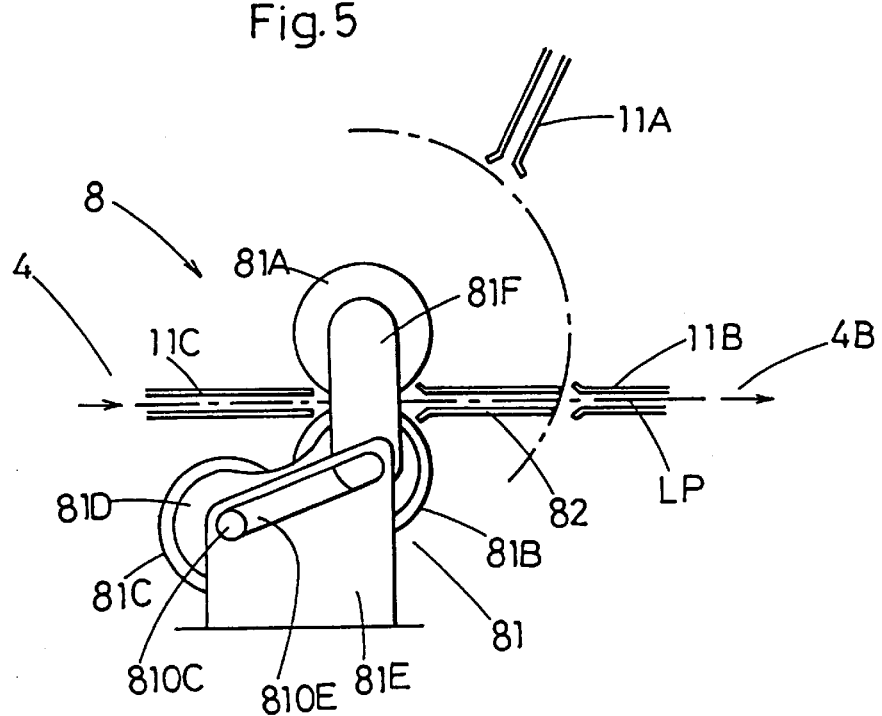
FIGS. 5 and 6 are side views showing a turnout device.
Figure 6:
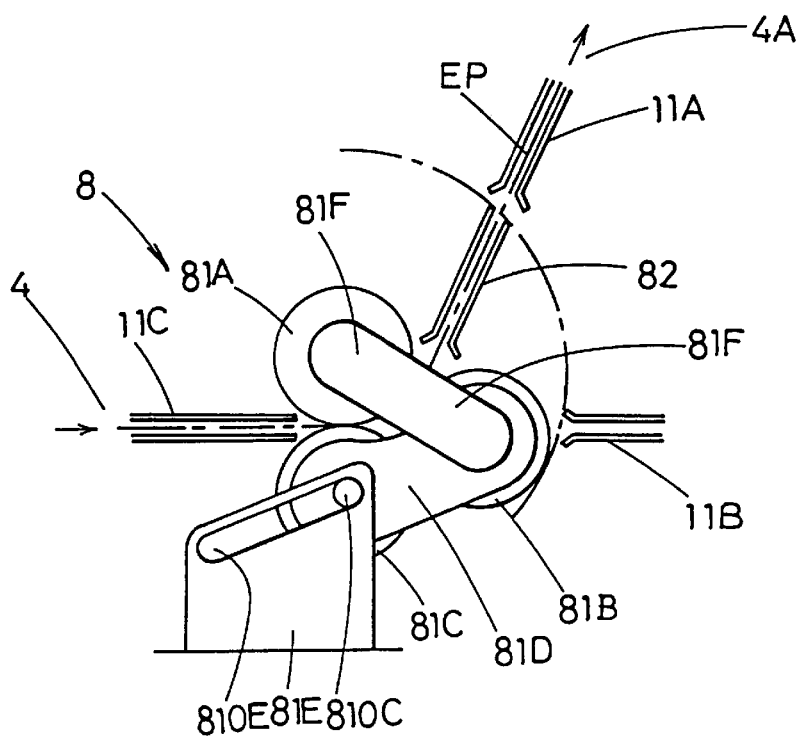

The turnout assembly 5A includes a turnout device 8 in the form of a switch for feeding sheets EP of a given service size from the transfer path 4 to the branch transfer path 4A. Turnout device 8 includes a switch roller assembly 81 and a paper guide 82 as shown in FIGS. 5 and 6.

The switch roller assembly 81 consists mainly of a drive roller 81A and a pair of front and rear press rollers 81B, 81C. The press rollers 81B and 81C are linked to each other by an arm 81D which also acts as a paper guide. The axes of the press rollers 81B and 81C are rotatably mounted to the arm 81D. The drive roller 81A is linked by an arm 81F to the press roller 81B. The axes of the drive roller 81A and the press roller 81B are rotatably mounted to the arm 81F. The axis 810C of the press roller 81C is movable in and along a guide slot 810E provided in a roller guide 81E. The paper guide 82 is movable together with the arm 81F for directing the sheets EP from the transfer path 4 to the branch transfer path 4A. The arm 81F is turned by a driving means (not shown).

When the arm 81F remains upright, the paper guide 82 is aligned with a receiver paper guide 11B situated at the start end of the main transfer path 4B and allows sheets LP of an enlarged size to pass between the drive roller 81A and the press roller 81B and move directly to the main transfer path 4B. When the arm 81F is inclined or tilted (counter-clockwise in the drawings), the paper guide 82 is communicated with a receiver paper guide 11A situated at the start end of the branch transfer path 4A and allows sheets EP to pass between the drive roller 81A and the other press roller 81C and enter the branch transfer path 4A while being guided by the arm 81D. Denoted by 11C is a feeder paper guide disposed across the transfer path 4.

Figure 10:
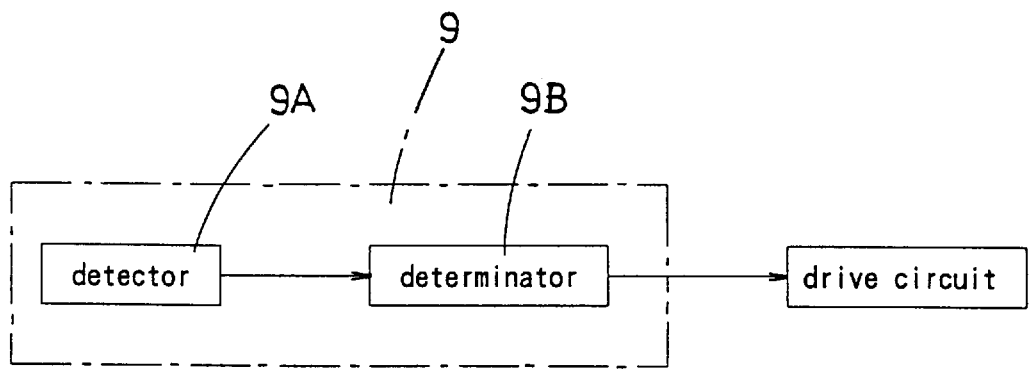
FIG. 10 is a block diagram of a controller for controlling operation of the turnout device.

Operation of the device 8 is controlled by a controller 9 comprising a detector 9A for detecting the width and/or length of incoming sheets EP, LP and a determinator 9B responsive to a detection signal from the detector 9A for producing a control signal to actuate a drive circuit of the device 8, as shown in FIG. 10. Upon detection of the size of a sheet EP, the device 8 is actuated to feed the sheet EP to the branch transfer path 4A. If the size of a sheet LP is detected, the device 8 is controlled to pass the sheet LP through a short cut of the main transfer path 4B to the development module 3.

Figure 7:
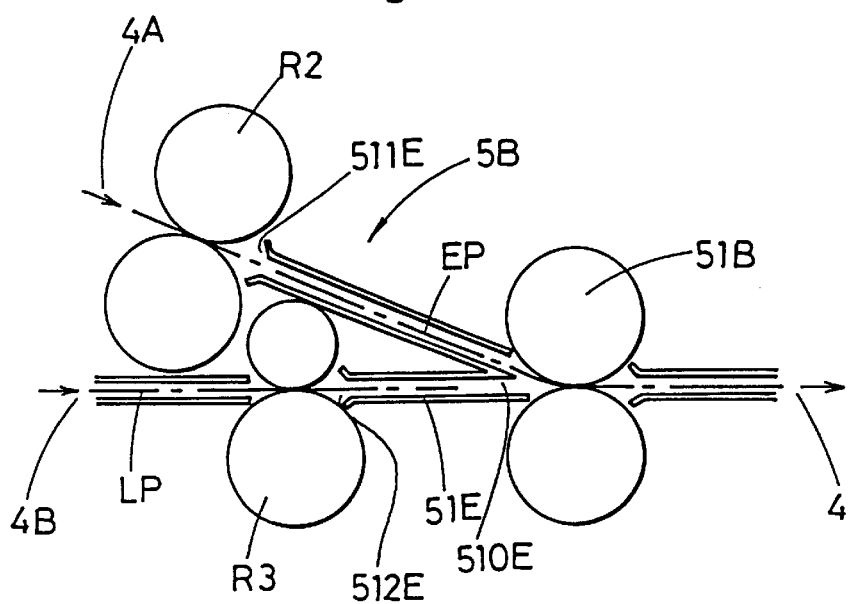
FIG. 7 is a side view showing a joining device.

As shown in FIG. 7, joiner device 5B comprises a V-shaped joint paper guide 51E mounted between a pair of joining rollers 51B situated at the joining position and two pairs of rollers R2 and R3 situated at the terminal ends of the branch transfer path 4A and the main transfer path 4B, respectively. The V-shaped joint paper guide 51E has one outlet 510E thereof communicated to between the joining rollers 51B and two inlets 511E and 512E communicated to between the rollers R2 and between the rollers R3, respectively. In operation, the sheets of the paper EP, LP conveyed along the branch transfer path 4A and the main transfer path 4B, respectively, are guided by the paper guide 51E and fed to between the joining rollers 51B before being further transferred along the transfer path 4 to the development module 3.

Figure 9:
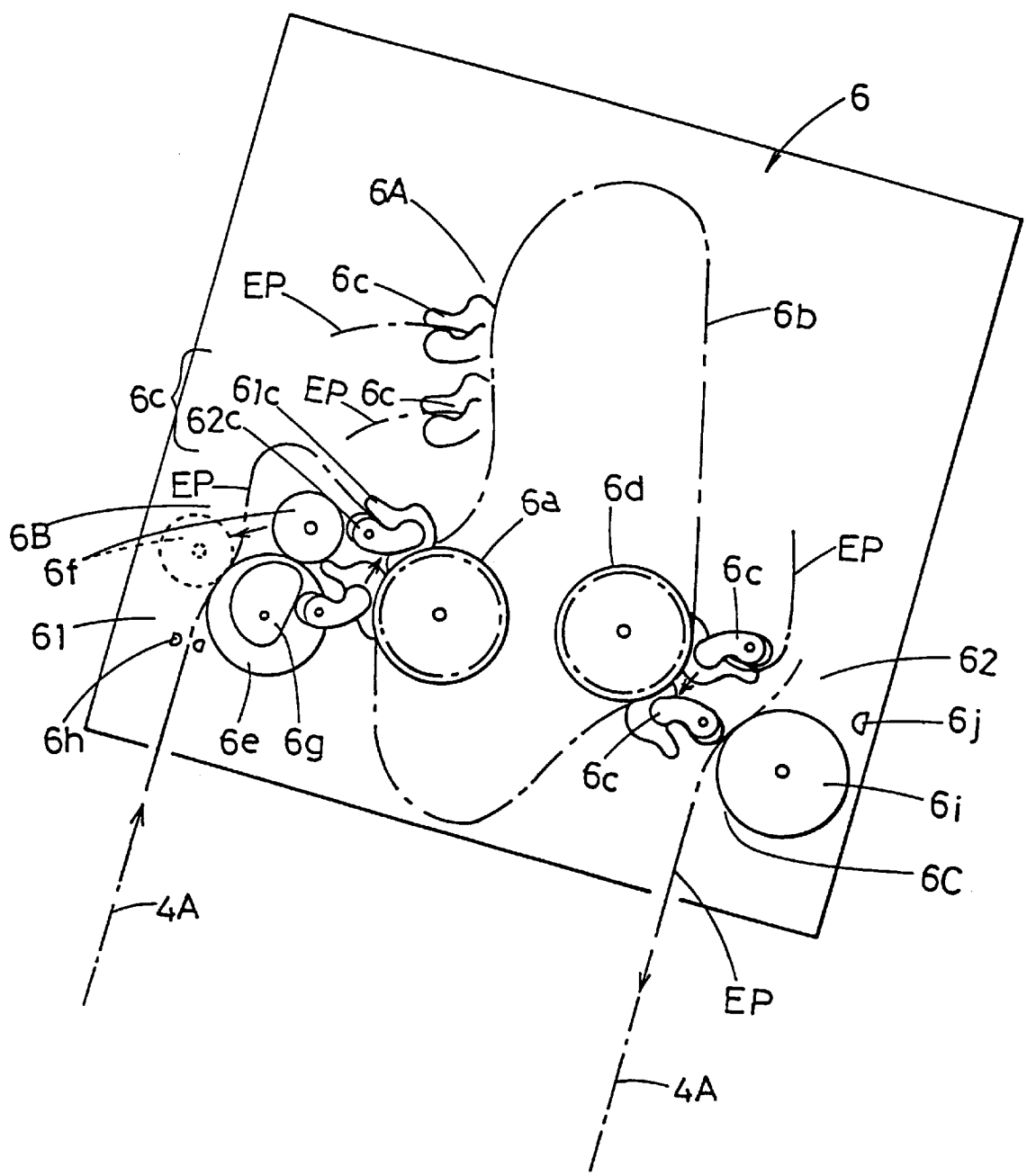
FIG. 9 is a side view showing a pausing device.

The pausing device 6 will now be explained referring to FIG. 9. The pausing device 6 temporarily holds a desired number of the printed sheets EP so that it can deliver them to the development module 3 at an optimum rate corresponding to the processing capability of the development module 3. The pausing device 6 comprises a holding means 6A for holding a series of the sheets EP temporarily, a feeding means 6B for feeding the sheets EP into the holding means 6A, and a delivering means 6C for releasing the sheets EP from the holding means 6A.

The holding means 6A has a plurality of grip members 6c mounted at equal intervals to a chain 6b which runs between two sprockets 6a and 6d. While the sheets EP are gripped by respective grip members 6c, they are conveyed from a feeding position 61 to a releasing position 62. Each grip member 6c comprises a main body 61c and a gripper arm 62c mounted to main body 61c and pivotable relative thereto between open and closed positions. The feeding means 6B is located at the feeding position 61 of the holding means 6A and comprises a drive roller 6e, a press roller 6f, a cam 6g, and a sheet sensor 6h. The press roller 6f is controlled in synchronization with the rotation of the sprockets 6a and 6d to travel along the circumference of the drive roller 6e. The sensor 6h upon detecting the leading end of a printed sheet EP fed from the printing module 2 produces a detection signal which allows the sheet EP to be nipped between the drive roller 6e and the press roller 6f and conveyed to a grip member 6c. The delivering means 6C comprises a drive roller 6i and a sensor 6j and is located at the releasing position of the pausing means 6A.

The operations of the pausing device 6 now will be explained in a sequence.

(1) When a grip member 6c has been moved to the feeding position, its gripper arm 62c is opened by operation of the cam 6g. Also, the press roller 6f is returned to a position close to the sensor 6h in response to the detection signal of the sensor 6h and holds the leading end of an infed sheet EP against the drive roller 6e.

(2) As the drive roller 6e rotates, the press roller 6f carries the sheet EP to allow the grip member 6c to accept the leading end of the sheet EP.

(3) Upon the leading end of the sheet EP reaching the grip member 6c, as calculated after the detection of the sensor 6h, the sprocket 6a is turned through a given angle to release the gripper arm 62c from the cam 6g and allow the grip member 6c to grip the leading end of the sheet EP between its arm 62c and main body 61c. Simultaneously, the press roller 6f is returned back to (its standby location) near the sensor 6h.

(4) The drive roller 6e is further rotated to carry the trailing end of the sheet EP towards the holding means 6A.

(5) By repeating the above operations of feeding the sheets EP to the grip members 6c, a desired number of the sheets EP are held in the holding means 6A.

(6) At the releasing position of the holding means 6A, the gripper arm 62c of the grip member 6c is opened by the drive roller 6i, thus releasing the sheet EP. Simultaneously, the sensor 6j detects the arrival of the sheet EP and produces a detection signal which then stops the rotation of the sprocket 6d. At this point, the sheet EP is held between the gripper arm 61c of the grip member 6c and the drive roller 6i. When the drive roller 6i is rotated, the sheet EP advances up to the branch transfer path 4A. Upon the sensor 6j detecting the trailing end of the sheet EP, its detection signal triggers rotation of the sprocket 6d. As the grip member 6c has reached the releasing position of the holding means 6A, the sheet EP is released and transferred to the branch transfer path 4A.

(7) By repeating the above operations, the sheets EP are temporarily held before being conveyed along the branch transfer path 4A to the development module 3.

Accordingly, the feeding rate of the sheets EP to the development module 3 can be maintained constant regardless of an abrupt change in the printing speed of the printing module 2, thus contributing to higher efficiency of conveying of the paper sheets. It is understood that the pausing device 6 is not limited to the described and illustrated arrangement.

The branch transfer path 4A may be increased in width so that multiple rows of the sheets EP are conveyed as having been allocated by a shifting device. This will increase the number of the sheets EP to be conveyed at once along the branch transfer path 4A which thus serves as a pausing device.

Figure 8:
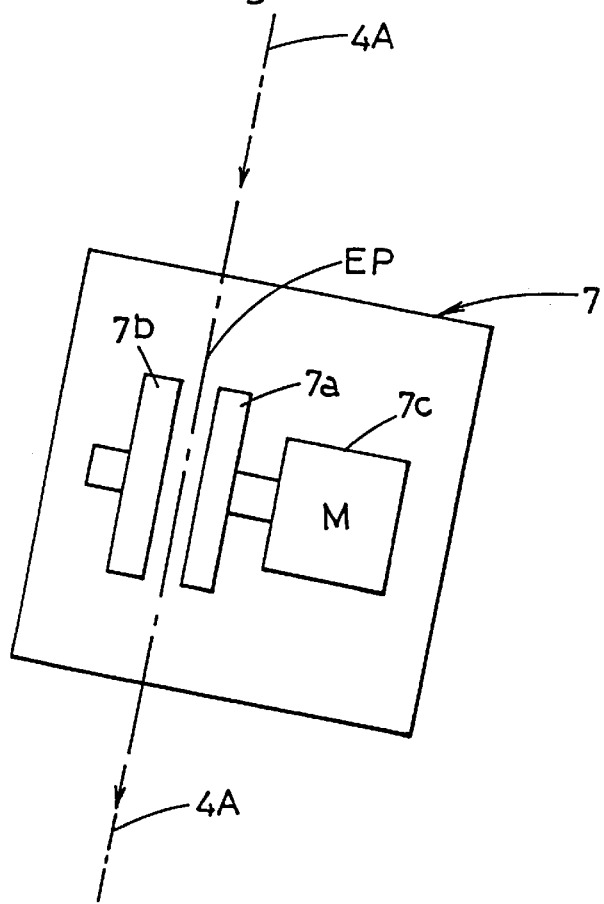
FIG. 8 is a side view showing a direction shifting device.

The direction shifting device 7 will now be explained referring to FIG. 8. The direction shifting device 7 comprises a pair of rotary disks 7a and 7b for holding and turning a sheet EP of a given service size, and a rotating means 7c for driving the rotary disks 7a and 7b to change the direction of the sheet EP. When the sheet EP is oriented with its short side extending in the direction of transfer, the number of the sheets EP per length of the transfer path increases. As a result, the transfer of sheets EP to the development module 3 will be enhanced in efficiency.

It is also understood that the direction shifting device 7 is not limited to the described and illustrated arrangement.

According to the above embodiment, the pausing device 6 and the direction shifting device 7 are provided at intermediate locations of the branch transfer path 4A, thus increasing the number of sheets of printed paper to be conveyed and enhancing operation of the printing module 2. This will allow the processing capability of the photographic printing and developing apparatus to increase by about 40 percent.

Figure 11:
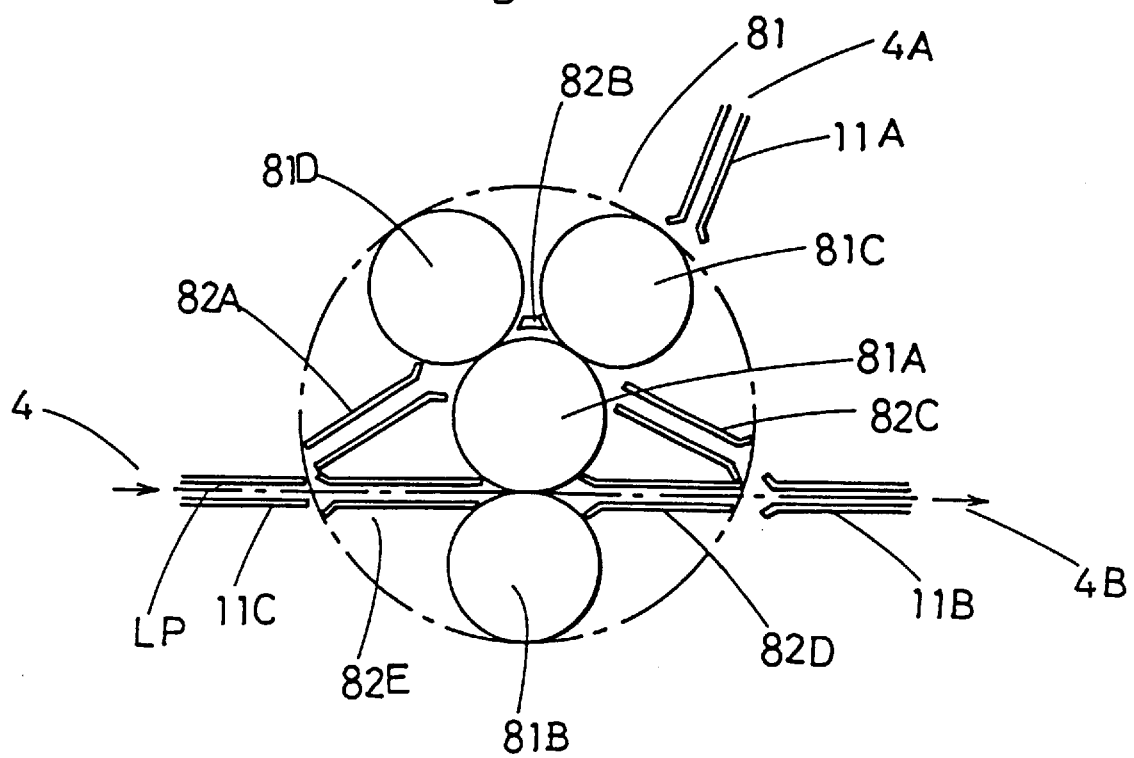
FIG. 11 is a side view showing a turnout device of another embodiment of the present invention.
Figure 12:
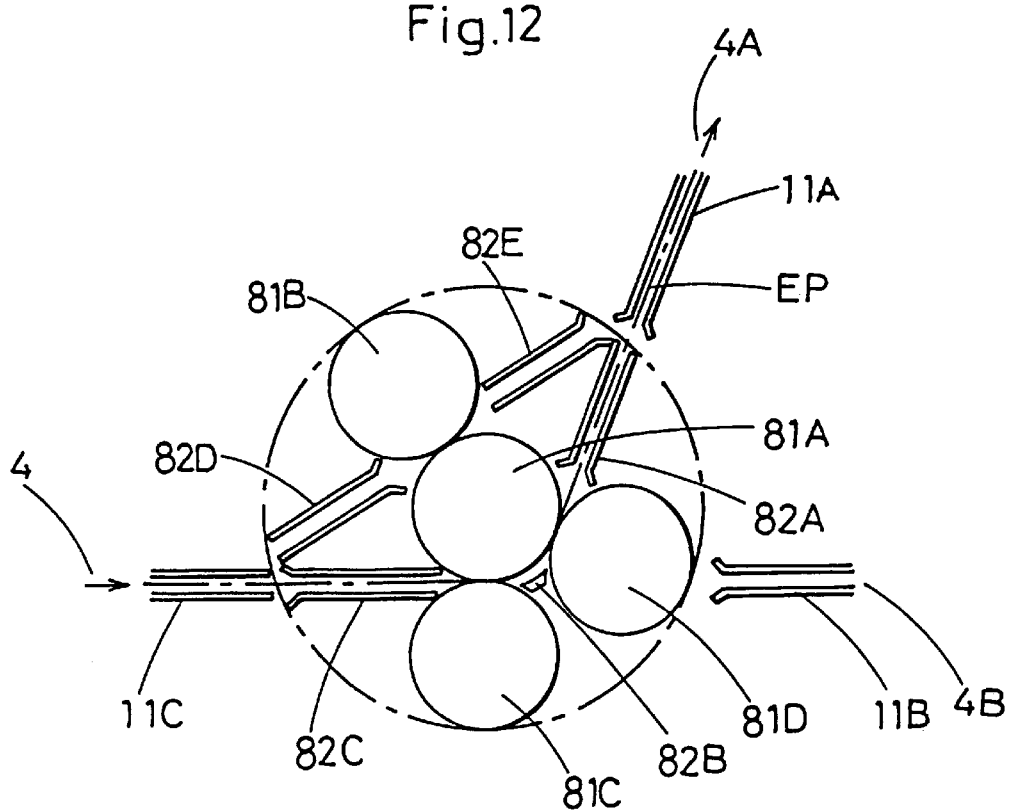
FIG. 12 is a side view thereof.

FIGS. 11 and 12 illustrate another form of the turnout device 8. The turnout device 8 of this embodiment comprises a switch roller assembly 81 and multiple paper guides 82A, 82B, 82C, 82D, and 82E. The switch roller assembly 81 consists mainly of a center drive roller 81A and three press rollers 81B, 81C, and 81D. The paper guides 82A, 82B, and 82C are provided for conveying the sheets EP of a given service size to the branch transfer path 4A while the other paper guides 82D and 82E are used for carrying the sheets LP of an enlarged size straight to the main transfer path 4B of the transfer path 4. The press rollers 81B to 81D and the paper guides 82A to 82E are moved about the center drive roller 81A by a driving means (not shown) as they remain in their relative positional relationships. Their movement is controlled to distribute the sheets EP to the branch transfer path 4A and the sheets LP to the main transfer path 4B.

FIG. 11 shows conveying of the sheets LP to the main transfer path 4B from the paper guide 82E aligned with the outlet of a paper guide 11C of the transfer path 4 to the paper guide 82D aligned with the inlet of a paper guide 11B of the main transfer path 4B. Accordingly, the sheets LP are conveyed from the paper guide 82E between the center drive roller 81A and the press roller 81B through the paper guide 82D to the main transfer path 4B.

FIG. 12 shows conveying of the sheets EP to the branch transfer path 4A from the paper guide 82C aligned with the outlet of the paper guide 11C of the transfer path 4 to the paper guide 82A aligned with the inlet of a paper guide 11A of the branch-transfer path 4A. Hence, the sheets EP are transferred from the paper guide 82C between the center drive roller 81A and the two press rollers 81C and 81D through the paper guide 82A to the branch transfer path 4A.

The operation of this turnout device 8 is controlled by a controller means which is similar to that described with respect to the first embodiment and will not be explained in further detail.

Figure 13:
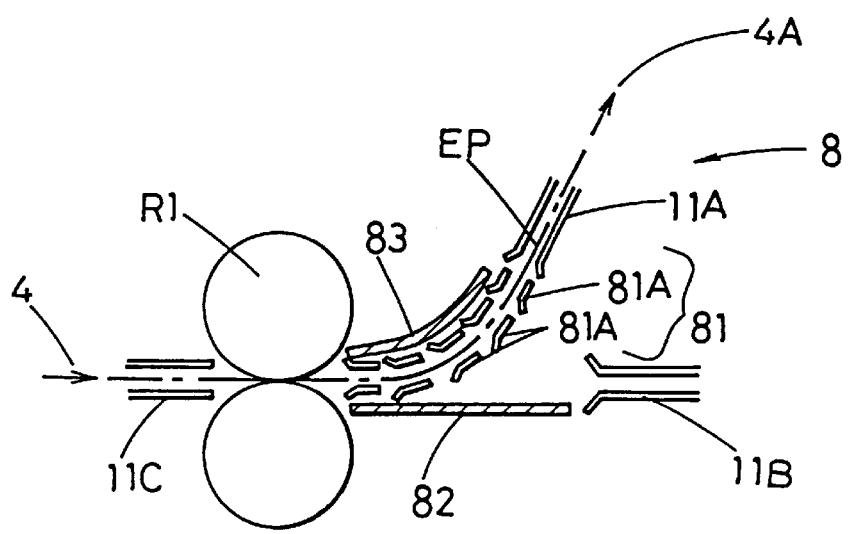
FIG. 13 is a side view showing a turnout device of a further embodiment of the present invention.
Figure 14:
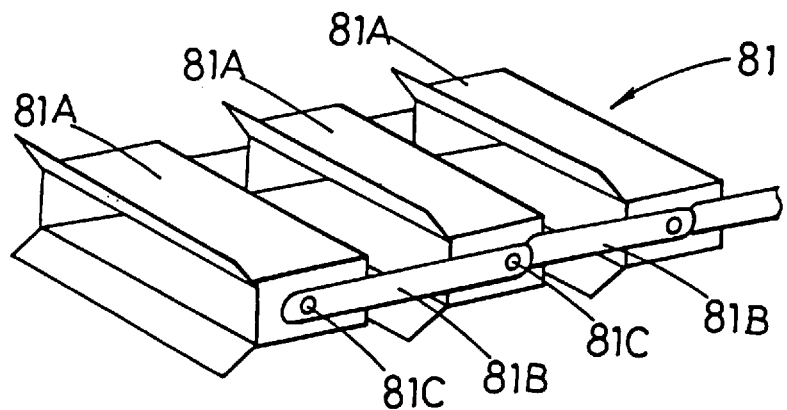
FIG. 14 is a perspective view of a paper guide thereof.
Figure 15:
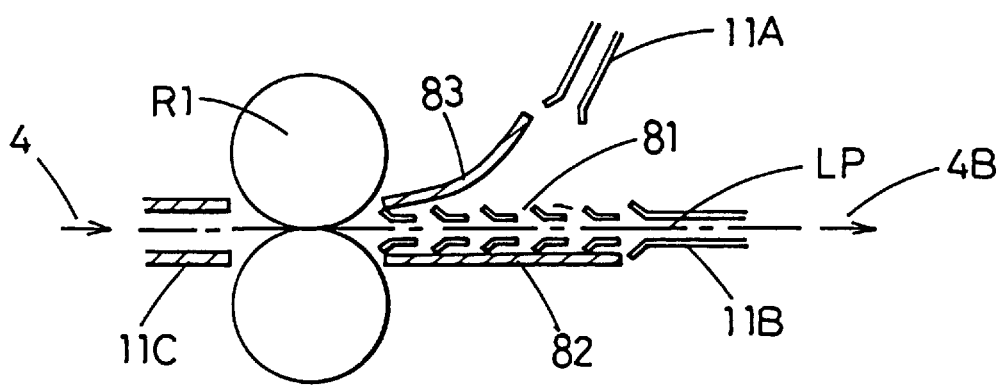
FIG. 15 is a side view thereof.

FIGS. 13 to 15 illustrate a further embodiment of the turnout device. The turnout device of this embodiment includes a flexible paper guide 81 capable of being bent towards the inlet of the branch transfer path 4A. The flexible paper guide 81 comprises a plurality of short guide segments 81A joined to one another by arm joiners 81B. More specifically, two adjacent guide segments 81A are joined to each other by arm joiner 81B which is pivotably mounted by pins 81C to sides of the guide segments 81A. The paper guide 81 is disposed between two, upper and lower, guide members 83, 82. When the paper guide 81 is moved downwardly, it is parallel to the lower guide member 82 and aligned with the inlet of a paper guide 11B of the main transfer path 4B. The paper guide 81 is actuated by a driving means (not shown) which is controlled by a controller similar to that described above. Denoted by R1 are a pair of rollers between a paper guide 11C of the transfer path 4 and the paper guide 81.

The other components are similar to those of the above described first embodiment and will not be explained in further detail.

Figure 16:
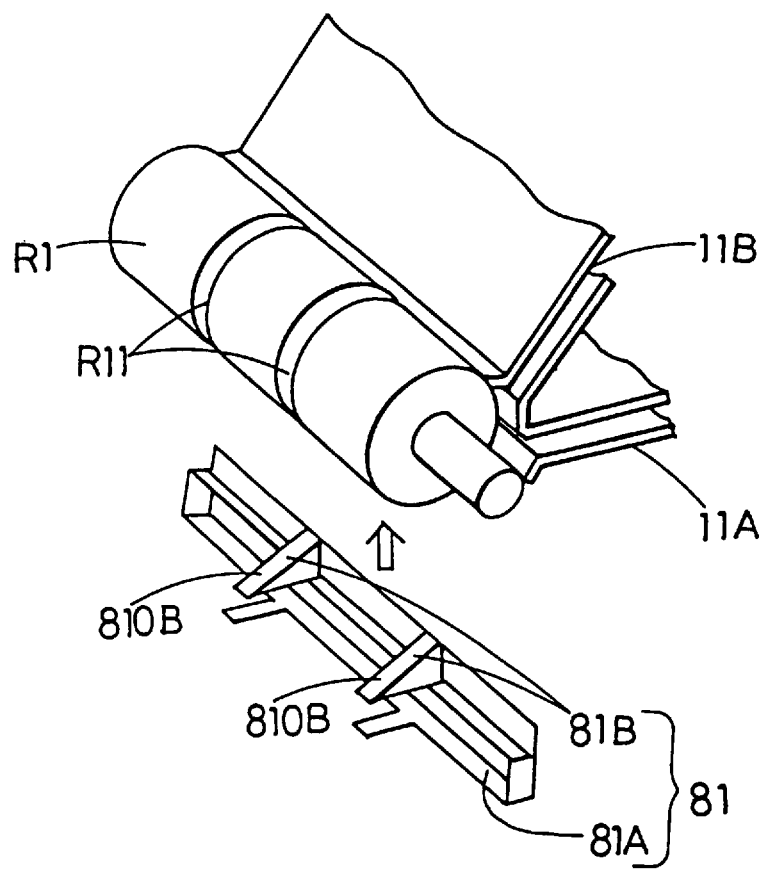
FIG. 16 is a perspective view showing a turnout device of another embodiment of the present invention.
Figure 17A:
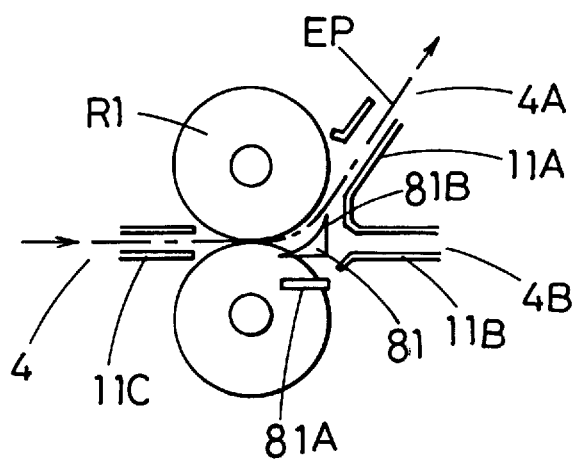
FIGS. 17(A) and 17(B) are side views thereof.
Figure 17B:
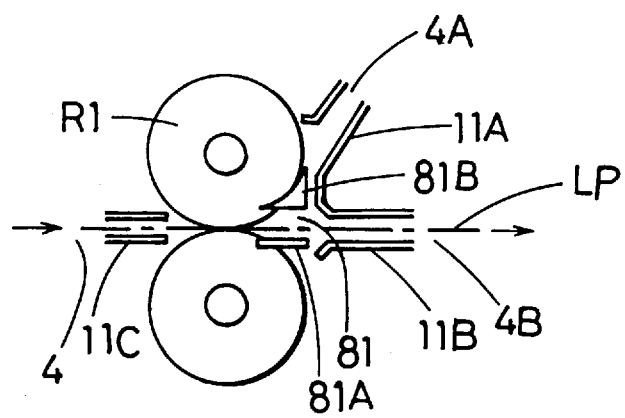

FIGS. 16–17(B) show a still further form of the turnout device 8. The turnout device 8 of this embodiment includes a paper guide 81 which is movable upwardly and downwardly. The paper guide 81 comprises a guide frame 81A and guide blocks 81B having respective tapered surfaces 810B and mounted to a top of guide frame 81A. Denoted by R1 are a pair of rollers between a paper guide 11C of the transfer path 4 and the paper guide 81. Each roller R1 has slots R11 for receipt therein of respective guide blocks 81B of the paper guide 81. When the paper guide 81 is moved downwardly, the sheets EP of a given service size travel along the tapered surfaces 810B of the guide blocks 81B and enter the branch transfer path 4A (FIG. 17(A)). When the paper guide 81 is lifted upwardly the sheets LP of an enlarged size run through the guide frame 81A and enter the main transfer path 4B (FIG. 17(B)).

There are also provided a paper guide 11A extending to the branch transfer path 4A and a paper guide 11B extending to the main transfer path 4B. The paper guide 81 is actuated by a driving means (not shown) which is controlled by a controller means similar to that described above. The other components of this embodiment are similar to the first embodiment and will not be described in further detail.

Figure 18:
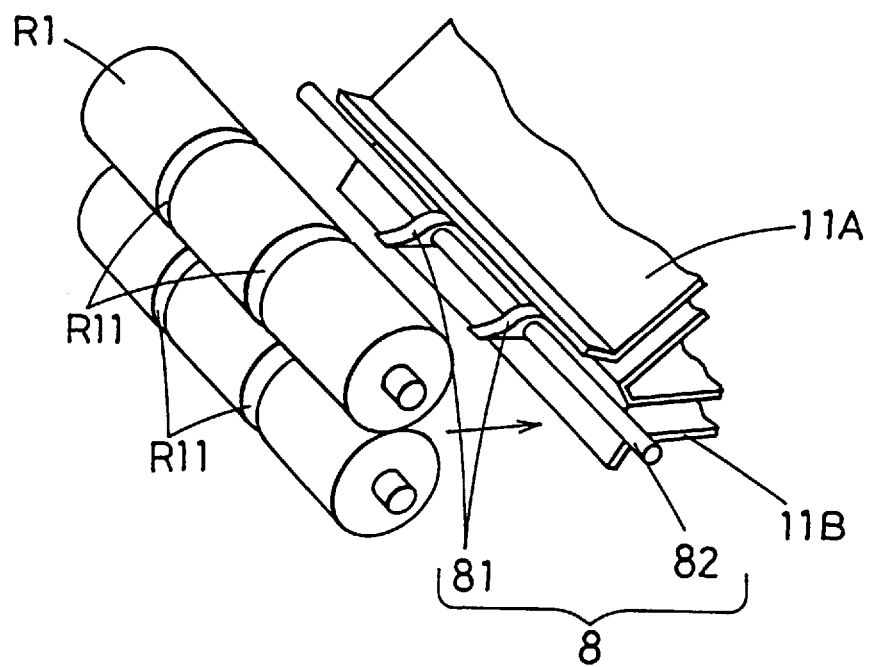
FIG. 18 is a perspective view showing a turnout device of a further embodiment of the present invention.
Figure 19A:
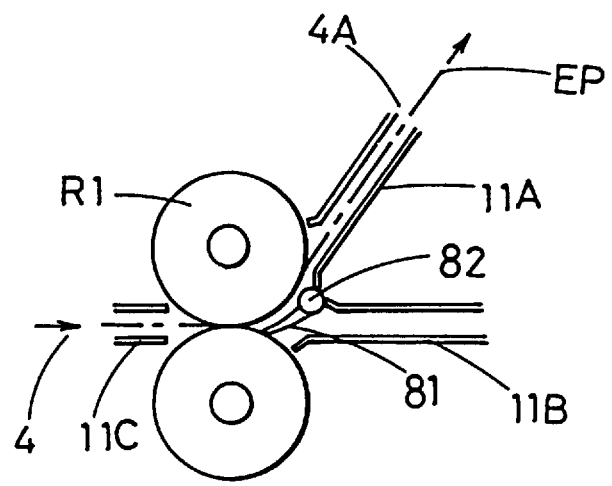
FIGS. 19(A) and 19(B) are side views thereof.
Figure 19B:
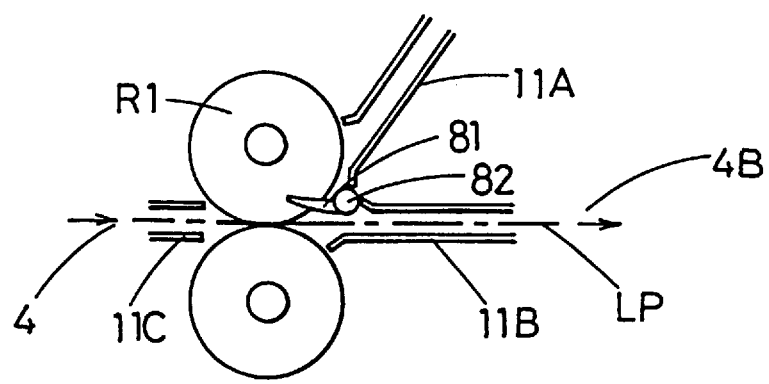

FIGS. 18–19(B) show a further embodiment of the turnout device 8. The turnout device 8 of this embodiment includes claw-shaped paper guides 81 mounted to a shaft 82 for swinging movements across a turnout position. Denoted by R1 are a pair of rollers between a paper guide 11C of the transfer path 4 and the paper guides 81. Each roller R1 has slots R11 for receipt therein of respective paper guides 81. When the paper guides 81 are pivoted downwardly by rotating the shaft 82, the sheets EP of a given service size travel to the branch transfer path 4A by being guided by the paper guides 81 (FIG. 19(A)). When the paper guides 81 are lifted upwardly, the sheets LP of an enlarged size pass straight to the main transfer path 4B (FIG. 19(B)).

There are also provided a paper guide 11A extending to the branch transfer path 4A and a paper guide 11B extending to the main transfer path 4B. The shaft 82 of the paper guides 81 is actuated by a driving means (not shown) which is controlled by a controller similar to that described above. The other components of this embodiment are similar to the first embodiment and will not be described in further detail.

Figure 20:
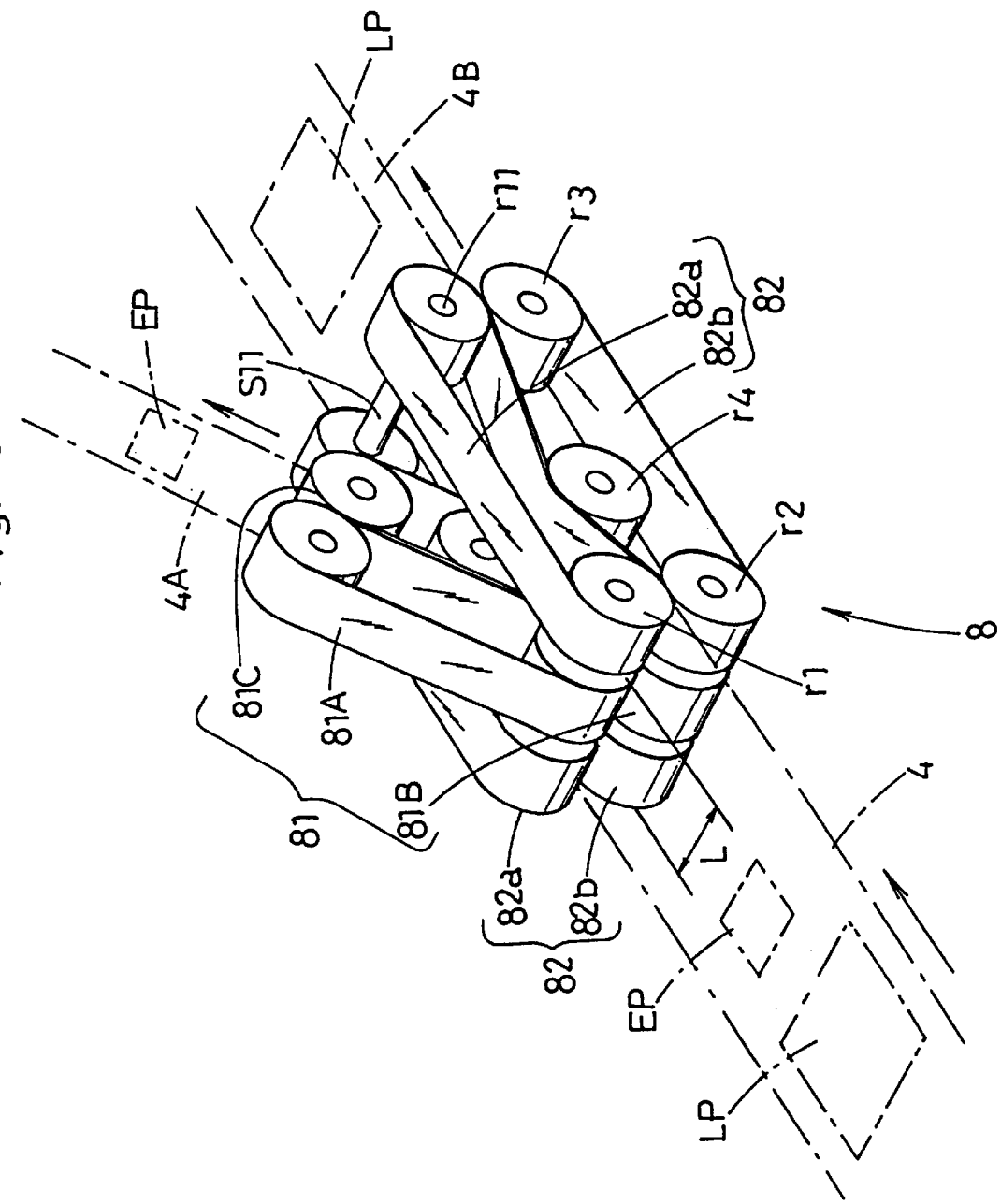
FIG. 20 is a perspective view showing a turnout device of another embodiment of the present invention.
Figure 21A:
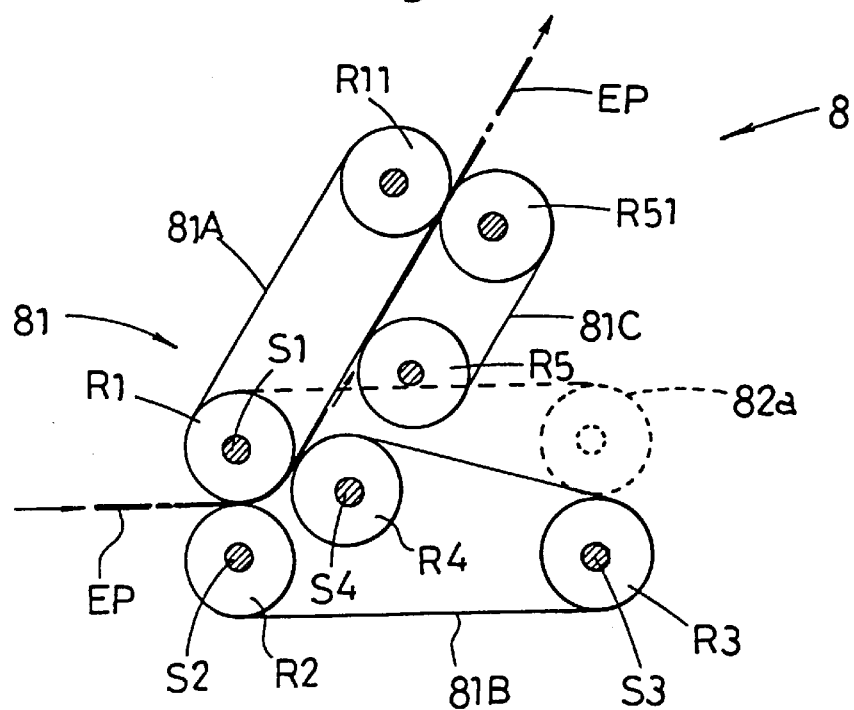
FIGS. 21(A) and 21(B) are side views thereof.
Figure 21B:
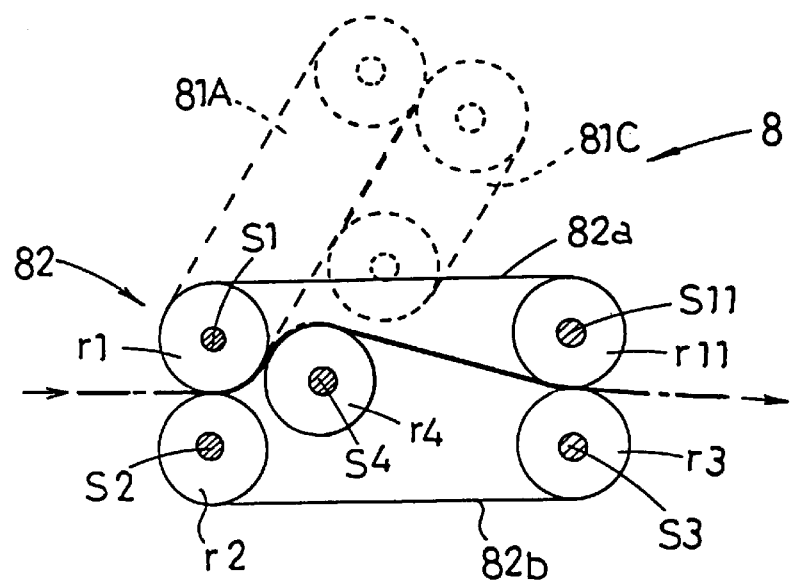

FIG. 20 is a perspective view of a further embodiment of the turnout device 8 and FIGS. 21(A)–21(B) show operation of this embodiment. The turnout device 8 comprises a branch conveyor belt assembly 81 for conveying the sheets EP of a given service size (with a smaller width) to the branch transfer path 4A, and a pair of main conveyor belt assemblies 82 for conveying the sheets LP of an enlarged size (with a greater width) to the main transfer path 4B. The branch conveyor belt assembly 81 is arranged with a center line thereof coinciding with a center line of the transfer path 4. The two main conveyor belt assemblies 82 are disposed on opposite sides of the branch conveyor belt assembly 81. The two main conveyor belt assemblies 82 are spaced from each other by a distance L which is larger than the width of the given service size sheet EP but smaller than the width of the enlarged sized sheet LP (FIG. 20).

The branch conveyor belt assembly 81 includes three endless belts 81A, 81B, and 81C. The endless belt 81A is mounted between two rollers R1 and R11, the endless belt 81B is installed on a drive roller R2, an idler roller R3, and a directional roller R4, and the endless belt 81C is mounted between two rollers R5 and R51. The front end of endless belt 81B is in direct contact with a front part of the endless belt 81A and is partially lifted upwardly by the directional roller R4 (FIGS. 21(A) and 21(B)). The endless belt 81C is shorter than the endless belt 81A and extends parallel to a rear part thereof.

Each main conveyor belt assembly 82 includes two, upper and lower, endless belts 82a and 82b between which paper sheets are passed. The upper endless belt 82a is mounted between two rollers r1 and r11, and the lower endless belt 82b is installed on a drive roller r2, an idler roller r3, and a guide roller r4. The two rollers r1 of the left and right endless belts 82a are located coaxially on opposite sides of the roller R1 of the endless belt 81A, and such three rollers r1, r1, and R1 are mounted on a shaft S1. The two other rollers r11 of the endless belts 82a are located on left and right sides of the transfer path and are mounted on a shaft S11. The two of the rollers r2 of the left and right endless belts 82b are located coaxially on opposite sides of the roller R2 of the endless belt 81B, and such three rollers r2, r2, and R2 are mounted on a shaft S2. The two second rollers r3 of the left and right endless belts 82b are located coaxially on opposite sides of the roller R3 of the endless belt 81B, and such three rollers r3, r3, and R3 are mounted on a shaft S3. The two guide rollers r4 on the left and right endless belts 82b are located coaxially on opposite sides of the roller R4 of the endless belt 81B, and such three rollers r4, r4, and R4 are mounted on a shaft S4.

The operation of the turnout device 8 of this embodiment now will be explained.

Each of the sheets EP and LP is conveyed with its center line overlapping the center line of the transfer path 4 until it arrives at the turnout device 8 (FIG. 20). Upon a sheet EP of a given service size being nipped between the two endless belts 81A and 81B of the branch conveyor belt assembly 81, it is turned upwardly by operation of the directional roller R4 and conveyed between the two endless belts 81A and 81C to the branch transfer path 4A (FIG. 21(A)). The sheet EP does not pass into the main conveyor belt assemblies 82 as its width is too narrow.

A sheet LP of an enlarged size is nipped between the two endless belts 81A and 81B of the branch conveyor belt assembly 81 and also its opposite sides are nipped between the two endless belts 82a and 82b of each main conveyor belt assembly 82. While the center of the sheet LP is turned upwardly by the branch conveyor belt assembly 81, both sides are lifted upwardly by operation of the guide rollers r4 of the left and right main conveyor belt assemblies 82. This prevents the sheet LP from being bent only at the center and fractured. As the sheet LP is conveyed further, each of its sides is turned back towards the main transfer path 4B because it is nipped between the two endless belts 82a and 82b of each main conveyor belt assembly 82. Accordingly, the center of the sheet LP follows and is turned towards the main transfer path 4B and is not carried into between the belts 81A and 81C of the branch conveyor belt assembly 81. The sheet LP is then conveyed to the main transfer path 4B.

As set forth above, the turnout device 8 of this embodiment does not require the controller described above.

Figure 22:
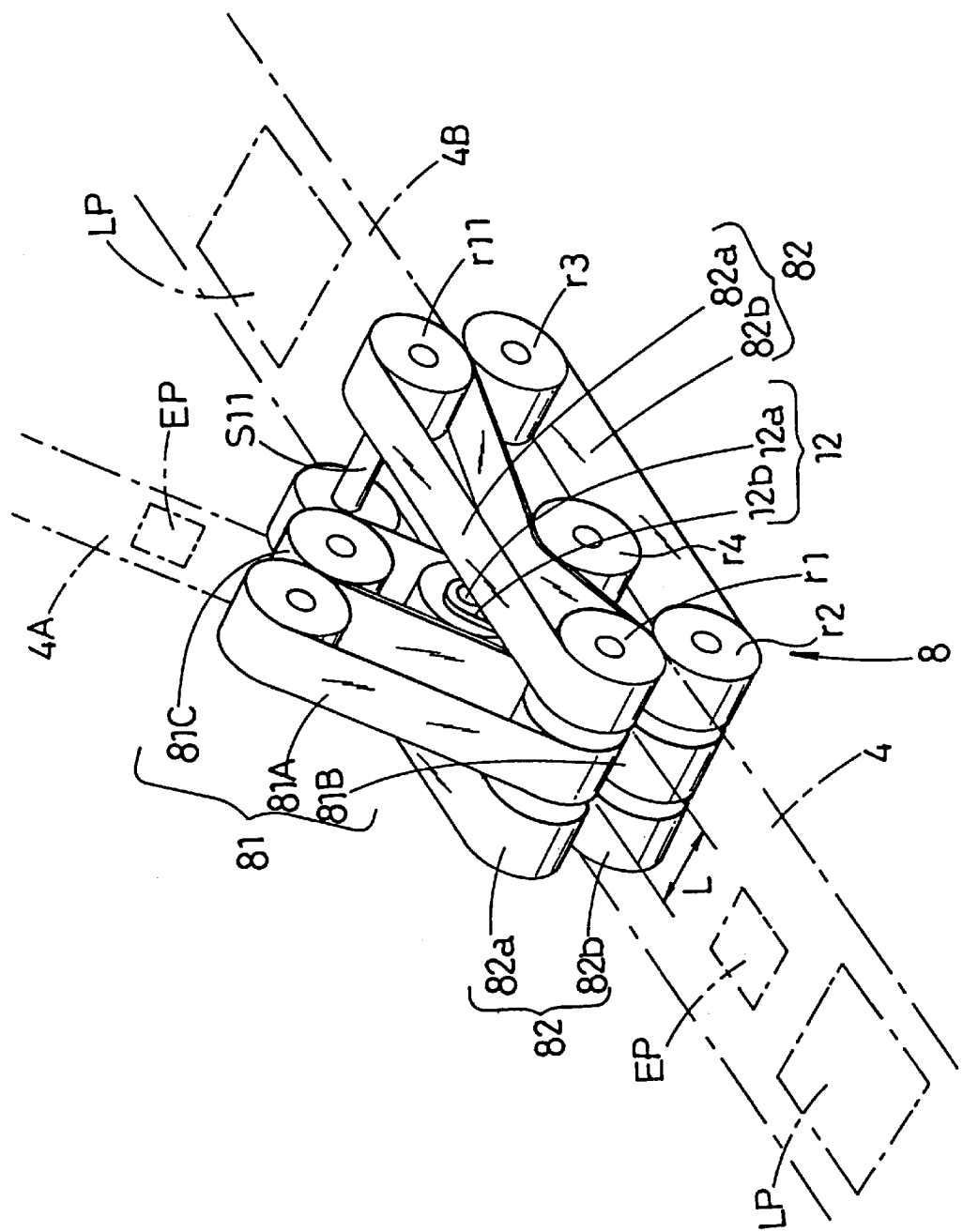
FIG. 22 is a perspective view showing a turnout device of a further embodiment of the present invention.
Figure 23A:
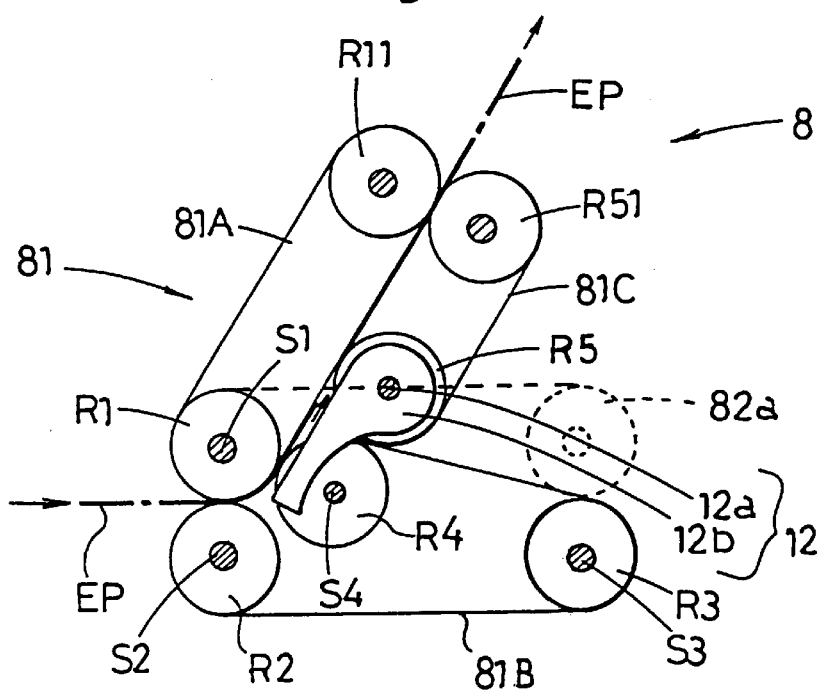
FIGS. 23(A) and 23(B) are side views thereof.
Figure 23B:
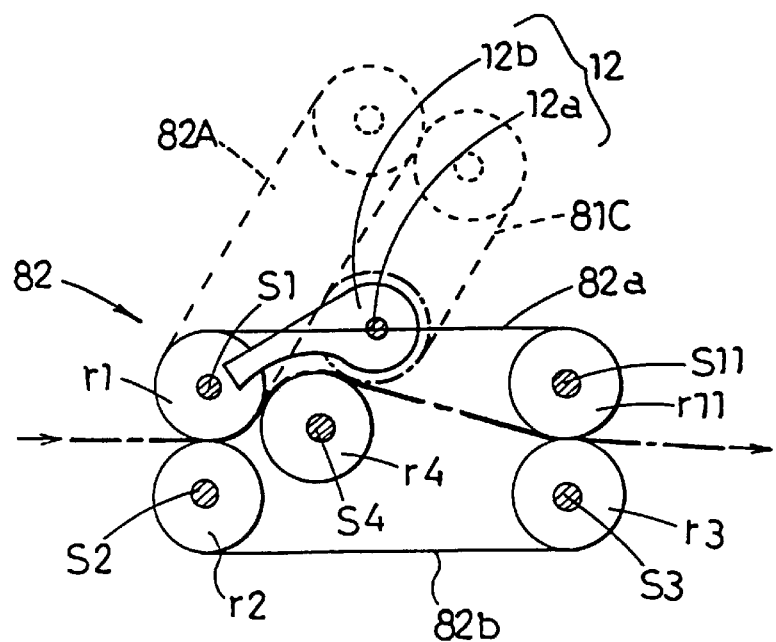
Figure 24:
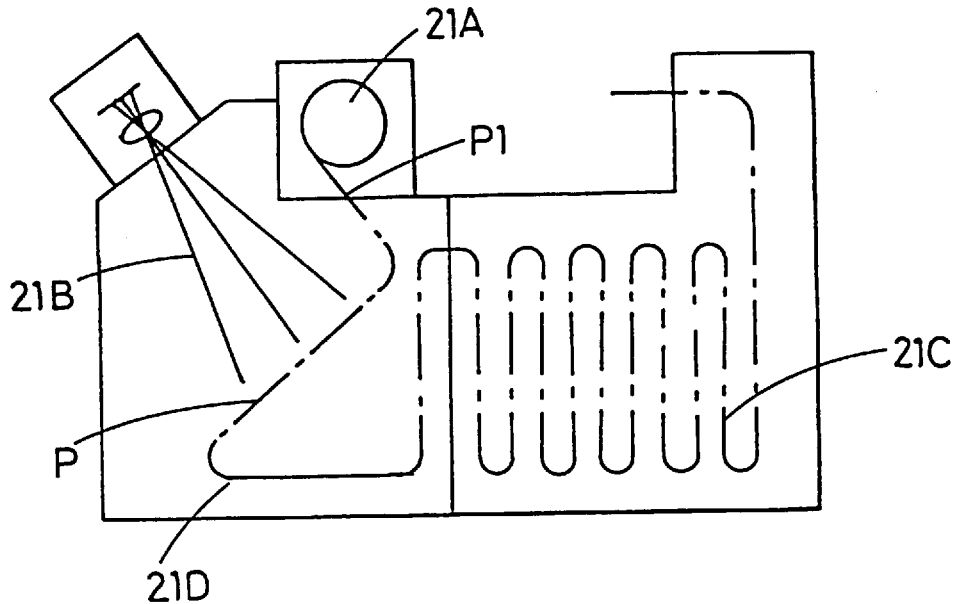
FIGS. 24 to 26 are schematic views showing prior art photographic printing and developing apparatuses.
Figure 25:
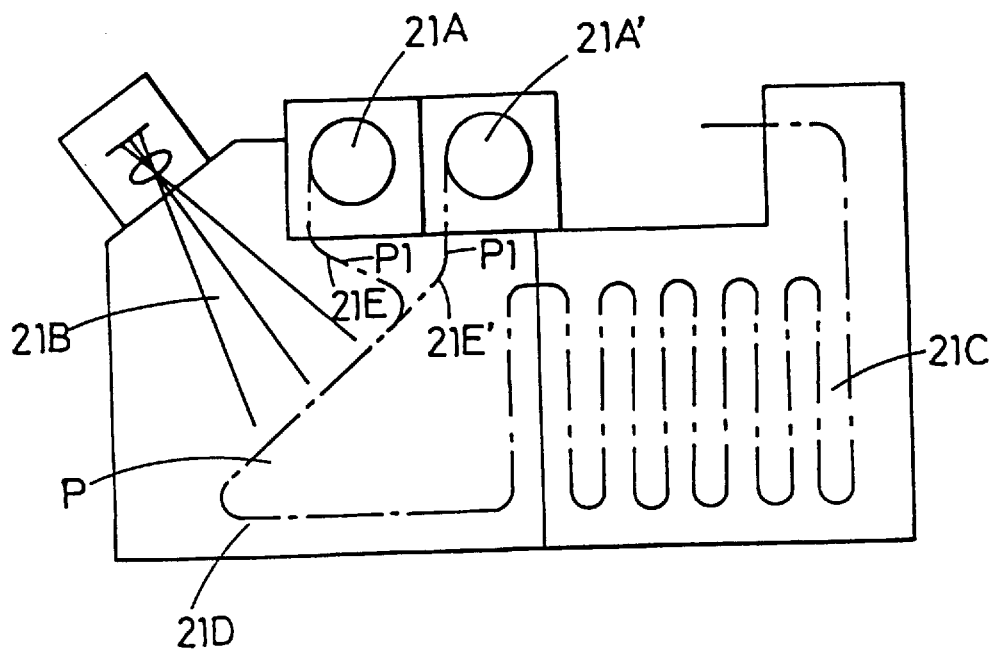
Figure 26:
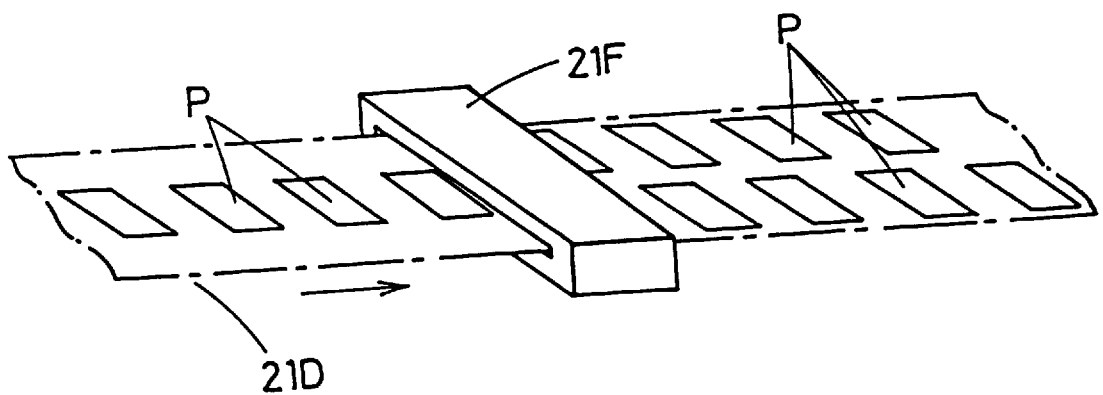

FIG. 22 is a perspective view of another turnout device and FIGS. 23(A) and 23(B) illustrate operation thereof. The turnout device of this embodiment is similar to that of the previous embodiment but has a support guide 12 added. The other arrangement and components are identical to those of the previous embodiment, are denoted by like numerals and will not be explained in further detail.

The support guide 12 comprises a shaft 12*a* and a guide plate 12*b* pivotably mounted on the shaft 12*a*. The guide plate 12*b* is located between the branch conveyor belt assembly 81 and the main conveyor belt assembly 82 (FIG. 22). When the guide plate 12*b* is turned downwardly, it acts as a guide for assisting the sheet EP to travel upwardly to between the two endless belts 81A and 81C, as shown in FIG. 23(A). When the guide plate 12*b* is turned upwardly as shown in FIG. 23(B), it limits the upward movement of the sheet LP which is thus conveyed straight to the main transfer path 4B. The support guide 12 is actuated by a driving means (not shown) which is controlled by a controller similar to that discussed above.

What is claimed is:

1. A photographic printing and development apparatus including a transfer path along which sheets of printed paper are conveyed from a printing station to a development station, said transfer path comprising:

a main transfer path;

a branch transfer path branching from said main transfer path at a separation position and joining said main transfer path at a joining position located downstream of said separation position; and a turnout device located at said separation position for passing sheets of a respective sizes to said branch transfer path or to said main transfer path, said turnout device comprising:

a branch conveyor assembly for transferring sheets of a narrower size to said branch transfer path and including two belts for nipping therebetween the thus transferred sheets; and at least one main conveyor assembly for transferring sheets of a wider size to said main transfer path, said main conveyor assembly being parallel to said branch conveyor assembly and including two belts for nipping therebetween the thus transferred sheets.

2. An apparatus as claimed in claim 1, further comprising a paper pausing device positioned along said branch transfer path for storing therealong a plurality of the narrower size sheets.

3. An apparatus as claimed in claim 2, further comprising a paper direction shifting device positioned along said branch transfer device for shifting the orientation of the narrower size sheets.

4. An apparatus as claimed in claim 1, further comprising a paper direction shifting device positioned along said branch transfer device for shifting the orientation of the narrower size sheets.

5. An apparatus as claimed in claim 1, wherein said turnout device further comprises a support guide for assisting the narrower size sheets to pass through said branch conveyor assembly and for assisting the wider size sheets to pass through said main conveyor assembly.

6. An apparatus as claimed in claim 5, wherein said support guide is mounted for movement between a first position for assisting the passage through said branch conveyor assembly and a second position for assisting the passage through said main conveyor assembly.

7. An apparatus as claimed in claim 6, further comprising a controller for controlling movement of said support guide between said first and second positions.

8. An apparatus as claimed in claim 1, comprising two main conveyor assemblies mounted on respective opposite sides of said branch conveyor assembly.

9. An apparatus as claimed in claim 8, wherein said two main conveyor assemblies are spaced by a distance to be greater than a width of the narrower size sheets.

10. An apparatus as claimed in claim 1, further comprising a joining device mounted at said joining position for guiding sheets from said branch transfer path and from said main transfer path to said development station.

11. An apparatus as claimed in claim 1, wherein said branch conveyor assembly comprises a first endless belt extending along said branch transfer path, a second endless belt having a front end closely adjacent a front part of said first endless belt and a rear portion extending from said front end parallel to said main conveyor assembly, and a third endless belt extending parallel to a rear portion of said first endless belt.

12. An apparatus as claimed in claim 11, wherein said main conveyor assembly comprises upper and lower endless belts.

13. An apparatus as claimed in claim 1, wherein said main conveyor assembly comprises upper and lower endless belts.

14. A turnout device, to be employed in a photographic printing and development apparatus including a transfer path along which sheets of printed paper are conveyed from a printing station to a development station, the transfer path including a main transfer path and a branch transfer path branching from the main transfer path at a separation position and joining the main transfer path at a joining position located downstream of the separation position, for passing sheets of a respective sizes to the branch transfer path or to the main transfer path, said turnout device comprising:

a branch conveyor assembly for transferring sheets of a narrower size to the branch transfer path and including two belts for nipping therebetween the thus transferred sheets; and at least one main conveyor assembly for transferring sheets of a wider size to the main transfer path, said main conveyor assembly being parallel to said branch conveyor assembly and including two belts for nipping therebetween the thus transferred sheets.

15. A turnout device as claimed in claim 14, wherein said turnout device further comprises a support guide for assisting the narrower size sheets to pass through said branch conveyor assembly and for assisting the wider size sheets to pass through said main conveyor assembly.

16. A turnout device as claimed in claim 15, wherein said support guide is mounted for movement between a first position for assisting the passage through said branch conveyor assembly and a second position for assisting the passage through said main conveyor assembly.

17. A turnout device as claimed in claim 16, further comprising a controller for controlling movement of said support guide between said first and second positions.

18. A turnout device as claimed in claim 14, comprising two main conveyor assemblies mounted on respective opposite sides of said branch conveyor assembly.

19. A turnout device as claimed in claim 18, wherein said two main conveyor assemblies are spaced by a distance to be greater than a width of the narrower size sheets.

20. A turnout device as claimed in claim 14, wherein said branch conveyor assembly comprises a first endless belt to extend along the branch transfer path, a second endless belt having a front end closely adjacent a front part of said first endless belt and a rear portion extending from said front end parallel to said main conveyor assembly, and a third endless belt extending parallel to a rear portion of said first endless belt.

21. A turnout device as claimed in claim 20, wherein said main conveyor assembly comprises upper and lower endless belts.

22. A turnout device as claimed in claim 14, wherein said main conveyor assembly comprises upper and lower endless belts.

\* \* \* \* \*